UNITED STATES PATENT OFFICE.

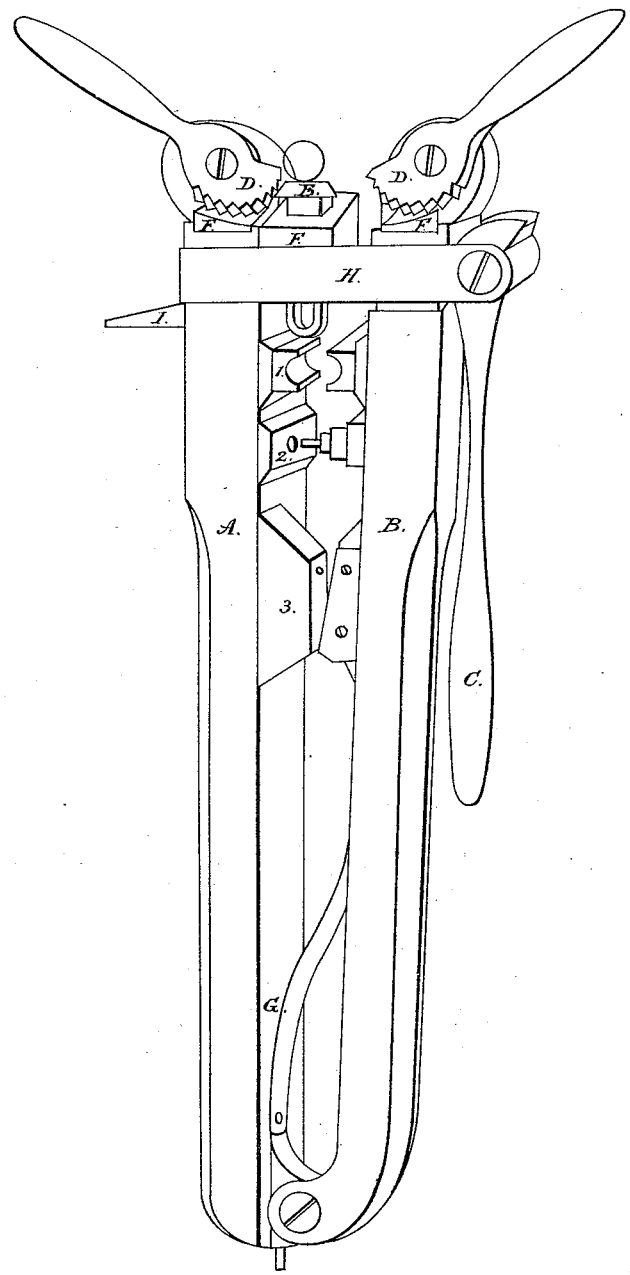

ORLANDO FOSTER, OF KENOSHA, WISCONSIN.

MACHINE FOR UPSETTING TIRES, &c.

Specification of Letters Patent No. 29,477, dated August 7, 1860.

*To all whom it may concern:*

Be it known that I, ORLANDO FOSTER, of the city of Kenosha, in the county of Kenosha and State of Wisconsin, have invented a new and Improved Upsetting, Punching, and Cutting Machine; and I do hereby declare that the following is a full and exact description thereof, reference being had to the accompanying drawings, making part of this specification, and to the letters of reference marked thereon, as follows:

A represents the stationary jaw, attached firmly to a post set in the ground, by the flange I; B the movable jaw, confined in its transit by the guide H.

D, D, are eccentric toothed cams, which clamp the tire to the dies F, F, F, the thickness required to be upset, and to prevent the iron from kinking, being regulated by the follower, E, which is graduated by the screw back of it, at any given point, to enable the iron to be upset to any desired thickness.

When the eccentric toothed cams, D D, are brought down to the tire placed on the dies F, F, F, the eccentric lever C is raised, causing the eccentric toothed cams D D, to hold the iron still firmer, and at the same time, the iron is upset to the size required; as soon as this is accomplished the eccentric lever C is thrown down, and by the action of the heavy spring G, between the jaws, the movable jaw, B recedes from its former position and renders the tire perfectly free to be taken out easily, as the eccentric toothed cams, immediately loose their hold when the eccentric lever C is thrown down.

In place of the circular dies F, F, F, as shown in the engraving, in case the iron desired to be upset is straight, I have square faced dies for each end, which can be easily adjusted in the grooves formed for holding the curved ones, and merely turn over the center die, giving a straight surface intsead of a curved one, and going through the same operation in upsetting as the machine is obliged to, in upsetting tire or anything of iron in a curved line.

In the stationary jaw A, I attach a swaging block marked 1, a punching block, marked 2, and steel shear marked 3, with corresponding block, punch and shear, in the movable jaw, B, and so arranged as to be used independent of each other when desired. The swaging block is made of dies of any particular pattern that you wish to form of the iron, and inserted in their proper place.

By the use of this machine, and the facility with which it is worked the smith is enabled to upset his tire in a very short space of time, and it is effected so rapidly that the tire can be tried, and if found necessary, a further upset given it with the same heat, a very desirable point to be gained.

What I claim as my invention and desire to secure by Letters Patent is—

The jaw (A) movable jaw (B) toothed cams (D, D) dies (F, F) eccentric lever (C), swaging block (1), punching block (2), and shears (3), as they are arranged in relation to each other, and operated as herein set forth.

ORLANDO FOSTER.

In presence of—
HIRAM TUTTLE,
EDWARD H. RUDD.